United States Patent Office

3,639,467
Patented Feb. 1, 1972

---

3,639,467
METHOD OF RECOVERING GLUTAMIC ACID FROM A FERMENTATION BROTH
Toshiaki Nagai and Isao Yamaura, Kawasaki-shi, Kanagawa-ken, Japan, assignors to Ajinomoto Co., Inc., Tokyo, Japan
No Drawing. Continuation-in-part of application Ser. No. 675,802, Oct. 17, 1967. This application Apr. 2, 1968, Ser. No. 718,192
Claims priority, application Japan, Nov. 1, 1966, 41/72,179
Int. Cl. C07c 99/12
U.S. Cl. 260—527 N    3 Claims

ABSTRACT OF THE DISCLOSURE

The mother liquor obtained after crystallization of glutamic acid from a fermentation broth at pH 3.2 is passed over a column of a strongly acidic cation exchange ion, preferably in the H-form, which adsorbs the residual glutamic acid from the mother liquor. The glutamic acid is eluted from the resin by another batch of the fermentation broth having a pH of 5 or higher, and the broth, thus enriched with glutamic acid, is adjusted to a pH near 3.2 to induce crystallization of glutamic acid. The mother liquor obtained after separation from the crystals is passed over the ion exchange column. Glutamic acid is thus recovered almost completely from the broth.

REFERENCE TO RELATED APPLICATION

This application is a continuation-in-part of our copending application Ser. No. 675,802, filed on Oct. 17, 1967, now abandoned.

BACKGROUND OF THE INVENTION

This invention relates to the recovery of L-glutamic acid from fermentation broths.

L-glutamic acid is produced on an industrial scale by fermentation of aqueous culture media containing assimilable sources of carbon and nitrogen, an specific inorganic and organic nutrients by a wide variety of microorganisms. The fermentation broth obtained contains microbial cells, original constituents of the culture medium, and by-products of microbial metabolism in addition to the glutamic acid. When the pH of the broth is adjusted to a pH value near the isoelectric point of glutamic acid (3.2), only ½ to ⅔ of the total glutamic acid present is precipitated in crystalline form. Methods other than the simple crystallization step have been used heretofore for improving the yield and/or the purity of the recovered glutamic acid.

It has been proposed to pass the broth in its entirety over a column of strongly acidic cation exchange ion resin, and to recover the adsorbed glutamic acid from the resin by chromatographic techniques (Japanese patent publication No. 7,461/1960).

According to the Japanese patent publication No. 17,311/1963, the broth is treated with an ion exchange resin of the carboxylic acid type to remove inorganic cations, and thereafter with a strongly acidic cation exchange resin for recovery of the glutamic acid. An attempt has also been made to recover glutamic acid from the broth by means of a weakly basic anion exchange resin (Japanese patent publication No. 7,919/1959).

It is a common feature of these methods that the resin must absorb the entire glutamic acid to be recovered, and that chemicals are needed for regenerating the resin and usually for eluting the glutamic acid from the resin. The afore-described known processes are, therefore, relatively costly and complex.

It is an object of the invention to recover glutamic acid almost completely from fermentation broths by utilizing the ability of certain ion exchange resins preferentially to absorb glutamic acid from the broth, yet to to do so with a minimal consumption of chemicals.

SUMMARY OF THE INVENTION

It has been found that glutamic acid may be eluted from strongly acidic cation exchange resins by the broth normally obtained by glutamic acid fermentation and having a pH of at least 5. The broth is thereby enriched with glutamic acid.

The method of the invention proceeds in a continuous batch process in which the enriched broth is adjusted to a pH near 3.2 to induce crystallization of glutamic acid therefrom, the crystals are recovered in the usual manner, and the mother liquor, which still contains much glutamic acid, is passed over the afore-mentioned cation exchange resin which retains most of the residual glutamic acid, whereupon a new cycle of operations may begin with the elution of the retained glutamic acid by another batch of the broth.

Only a portion, typically ⅓ to ½ of the glutamic acid originally present in the broth, is thus adsorbed on the ion exchange resin, and the capacity of the ion exchange column may be relatively small. The amount of acid or other regenerating liquid employed for restoring the adsorption properties of the column after elution is correspondingly reduced. No chemicals are needed for eluting the column, and almost glutamic acid is recovered by a single, conventional, and inexpensive crystallization step.

The mother liquor normally has a pH of about 3.2, and may be passed over the ion exchange column or otherwise brought into contact with the resin without further adjustment. Depending on the nature and condition of the resin, the pH of the mother liquor may be adjusted to some other value lower than 4 prior to contact with the resin. In this pH range, the inorganic salts present in the broth are not significantly retained by the resin.

Contact between the resin and the mother liquor at a pH below 4, and between the resin and the fermentation broth at a pH above 5, may be brought about by suspending the resin in the liquid mixture. However, the known procedure of passing the liquor or the broth over a column of the resin is normally preferred. The rate of flow of the mother liquor over the resin column should be held between 0.1 and 10 liters per liter of resin per hour and preferably between 0.5 and 2. The preferred pH of the mother liquor is between 1 and 3 so that the dissolved glutamic acid behaves mainly as a cation.

All commercially available strongly acidic cation exchange resins may be employed. Examples of such resins are Amberlite IR-120, Dowex 50, Diaion SK-1, and Duolite C-25. The hydrogen form of the resins has greater adsorption capacity for glutamic acid, but the resins may also be employed in the salt form, such as the sodium or ammonium form. The amount of resin required varies with the composition and volume of the mother liquor and fermentation broth to be handled.

When a fermentation broth having the usual pH of 7–8 is employed for eluting the adsorbed glutamic acid from the resin, the eluate has a pH of 5.0±0.5 at which the elution of the glutamic acid from the resin is almost complete.

Other organic nitrogen compounds which are present in the broth accompany the glutamic acid through the adsorption and elution steps but are separated therefrom by crystallization at pH 3.2. They are, therefore, accumulated in the sequential batches of mother liquor, and it is necessary to discard the mother liquor after a series of cycles or to discard a portion of the mother liquor in each cycle. The amount of organic nitrogen compounds present is readily determined by analyzing the material adsorbed on the resin or the effluent for total nitrogen and for glutamic acid nitrogen.

The accumulation of other nitrogen compounds is not very rapid, however, because the strongly acidic cation exchange resins adsorb glutamic acid more readily than other nitrogen bearing organic compounds. In a series of sixteen runs, the average ratio of glutamic acid to organic nitrogen was 2.59:1 in the mother liquor, 1.19:1 in the effluent, and 3.38:1 in the material adsorbed on the resin.

DESCRIPTION OF PREFERRED EMBODIMENTS

The following examples are further illustrative of the present invention but it will be understood that the invention is not limited thereto.

Example 1

Three liters of a fermentation broth obtained from a culture medium in which molasses was the carbon source were adjusted to pH 3.2 with 12 N sulfuric acid and stirred overnight to crystallize glutamic acid. The crystals in the resulting slurry were separated from the mother liquor which still contained 136.5 g. glutamic acid.

The pH of the mother liquor was adjusted to 1.5 with sulfuric acid, and the strongly acidic liquor was passed at ambient temperature (22–24° C.) and at a rate of 1 liter per liter resin per hour over a column of 3 liters Diaion SK–1B (a strongly acidic cation exchange resin) in the hydrogen form having a height of 17 cm., 111.7 g. glutamic acid were adsorbed by the resin.

5 liters of untreated fermentation broth containing 274.3 g. glutamic acid and 11.9 g. calcium ions were then passed over the column at a rate of 2 liters per liter of resin per hour to elute the glutamic acid, whereupon the column was washed with 0.75 liters water. The combined eluate and washings contained 97.8 g. glutamic acid removed from the resin, and yielded 257.1 g. dry glutamic acid crystals after adjustment to pH 3.1. The crystals contained 85.6% glutamic acid and only 0.07% calcium. This corresponded to 80.3% of the glutamic acid originally present in the fermentation broth used for elution. The mother liquor and washings had a combined volume of 5.98 liters and contained 151.9 g. glutamic acid.

The pH of the mother liquor was adjusted to 1.5 with concentrated sulfuric acid, and the acid liquor was passed over a column of 3 liters of the same resin in the hydrogen form. The resin retained 117.2 g. glutamic acid, and the ratio of glutamic acid to organic nitrogen in the adsorbed material was 4.29:1. The corresponding value in the effluent was 1.77:1.

The glutamic acid was eluted from the column with yet another batch of the fermentation broth, and the procedure outlined above was repeated four times. Table 1 lists information on the second to fifth runs.

TABLE 1

| Run Number | 2 | 3 | 4 | 5 |
|---|---|---|---|---|
| Fermentation broth (g.): | | | | |
| Glutamic acid | 268.8 | 176.0 | 294.7 | 243.8 |
| Calcium | 10.5 | 12.0 | 27.3 | 12.9 |
| Glutamic acid crystals recovered: | | | | |
| Weight (g., dry basis) | 274.0 | 246.5 | 257.4 | 231.0 |
| Purity (percent) | 99.5 | 96.4 | 87.5 | 95.2 |
| Calcium content (g.) | 0 | 0.05 | 0.07 | 0.16 |
| Yield of (percent glutamic in broth) | 101.6 | 86.1 | 76.4 | 90.2 |
| Mother liquor: | | | | |
| Volume (l.) | 5.46 | 5.81 | 5.76 | 5.96 |
| Glutamic acid (g.) | 110.2 | 124.4 | 149.7 | 152.2 |
| Glutamic acid adsorbed on resin (g.) | 108.2 | 101.7 | 118.4 | 122.4 |
| Ratio of glutamic acid to organic nitrogen in the effluent | 0.80 | 1.39 | 1.50 | 1.76 |

Example 2

The procedure of Example 1 was repeated with a mother liquor whose pH had been adjusted to about 1.5 with concentrated hydrochloric acid and which was passed over 3.25 liters of the resin in the sodium form at a rate of 1 liter per liter resin per hour. The resin was regenerated with 10 percent aqueous sodium chloride solution into sodium form.

In 12 consecutive runs, on an average, 84.8% of the glutamic acid present in the fermentation broth was recovered:

TABLE 2

| | Glutamic acid in broth, g. | Crude glutamic acid | | | Glut. acid yield percent |
|---|---|---|---|---|---|
| | | Weight (wet), g. | Glut. Acid content, percent | Calcium content, percent | |
| 1 | 272 | 300 | 90.8 | 0.07 | 75.2 |
| 2 | 179 | 233 | 76.8 | 0.18 | 94.1 |
| 3 | 253 | 308 | 82.1 | 0.10 | 76.3 |
| 4 | 253 | 274 | 92.3 | 0.24 | 77.9 |
| 5 | 285 | 340 | 83.9 | 0.09 | 83.3 |
| 6 | 299 | 322 | 92.8 | 0.10 | 87.3 |
| 7 | 246 | 277 | 88.7 | 0.05 | 81.1 |
| 8 | 235 | 261 | 90.0 | 0.02 | 92.5 |
| 9 | 284 | 337 | 84.2 | 0.06 | 94.0 |
| 10 | 258 | 286 | 90.3 | 0.05 | 89.8 |
| 11 | 271 | 292 | 92.7 | 0.02 | 84.5 |
| 12 | 324 | 347 | 93.3 | 0.02 | 81.9 |
| Average | 263 | 298 | 88.2 | 0.08 | 84.8 |

Example 3

The procedure of Example 1 was repeated with a mother liquir whose pH remained unchanged at about 3.2, and which was passed over 4.4 liters of the resin in the sodium form at a rate of 1 liter per liter resin per hour.

In 15 consecutive runs, on an average, 81% of the glutamic acid present in the fermentation broth were recovered. The crystals recovered contained 95% glutamic acid and 0.06% calcium. The mother liquors employed had an average volume of 6.55 liters and a glutamic acid content of 2.60 g./dl., 32 grams glutamic acid were adsorbed on each liter of resin.

When the ammonium salt form of the resin was substituted in the above procedure for the sodium salt form, the average yield of crystals in five runs was 83%, and the crystals contained 94% glutamic acid and 0.07 calcium. The glutamic acid was adsorbed on the resin at an average rate of 33 g. per liter.

The method of the invention thus is practiced in a very simple manner. It consists of only a few steps. The crude broth is contacted with glutamic acid bearing resin. Crystals of glutamic acid are precipitated from the enriched broth and are separated from the mother liquor by filtration, sedimentation, or centrifuging, as usual. The mother liquor is next contacted with the resin before the next batch of broth is treated.

The crystallization step being conventional and commonly employed in this art, the invention achieves a substantial increase in yield by the simple steps of passing the mother liquor and the broth over a resin column. It is not necessary to remove the bacterial cells from the broth, a notoriously difficult operation which has sometimes been used heretofore in efforts to increase the yield of glutamic acid. The ion exchange resin, if employed in the hydrogen form, has to be regenerated from time to time by passage of a mineral acid, as is conventional. The apparatus employed is very simple.

Recovery rates of 80% or more are readily achieved, and the crop of crude crystals may have a purity of 95% and contain only 0.1% calcium even if calcium rich sugar cane molasses, the cheapest carbon source, are used in the fermentation medium.

While the invention has been described with particular reference to specific embodiments, it is to be understood that it is not limited thereto, but is to be construed broadly and restricted solely by the scope of the appended claims.

What is claimed is:

1. In a method of recovering glutamic acid from a plurality of batches of a fermentation broth having a pH of at least 5.0 in which a major portion of the glutamic acid in each batch is separated from a mother liquor by crystallization, the improvement which comprises:
  (a) contacting a first batch of said mother liquor while at a pH value of less than 4 with a strongly acidic cation exchange resin, whereby residual glutamic acid is adsorbed by said resin;
  (b) contacting the glutamic acid bearing resin with a batch of said broth, whereby the adsorbed glutamic acid is removed from the resin and dissolved in the broth;
  (c) adjusting the pH of the broth having said removed glutamic acid dissolved therein to a value near 3.2 to induce crystallization of glutamic acid;
  (d) separating the crystallized glutamic acid from a second batch of mother liquor; and
  (e) contacting said second batch with a strongly acidic cation exchange resin, whereby glutamic acid from said second batch is adsorbed by the resin.

2. In a method as set forth in claim 1, said resin being in the hydrogen form, and the pH of said second batch of mother liquor being adjusted to less than 3.2 prior to the contacting of said second batch with said resin.

3. In a method as set forth in claim 1, said broth, prior to said adjusting of the pH thereof, having a pH value of approximately 7 to 8.

References Cited
UNITED STATES PATENTS
3,336,374  8/1967  Dobry _____ 260—527

JAMES A. PATTEN, Primary Examiner

V. GARNER, Assistant Examiner